United States Patent
Yoo et al.

(10) Patent No.: US 9,197,253 B2
(45) Date of Patent: Nov. 24, 2015

(54) RF SWITCH

(71) Applicant: SAMSUNG ELECTRO-MECHANICS CO., LTD., Suwon-Si, Gyeonggi-Do (KR)

(72) Inventors: Hyun Jin Yoo, Suwon-si (KR); Yoo Sam Na, Suwon-si (KR); Jong Myeong Kim, Suwon-si (KR); Hyun Hwan Yoo, Suwon-si (KR); Yoo Hwan Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 13 days.

(21) Appl. No.: 14/269,073

(22) Filed: May 2, 2014

(65) Prior Publication Data
US 2015/0133065 A1  May 14, 2015

(30) Foreign Application Priority Data
Nov. 11, 2013  (KR) .......................... 10-2013-0136548

(51) Int. Cl.
*H04B 1/40* (2015.01)
*H04B 1/00* (2006.01)

(52) U.S. Cl.
CPC ...................................... *H04B 1/006* (2013.01)

(58) Field of Classification Search
CPC .................................. H04B 1/006; H04B 1/00
USPC ............................. 455/77, 78, 333, 338, 550.1
See application file for complete search history.

(56) References Cited

U.S. PATENT DOCUMENTS

| | | | | |
|---|---|---|---|---|
| 7,123,898 B2* | 10/2006 | Burgener et al. | ............. | 455/333 |
| 7,796,969 B2* | 9/2010 | Kelly et al. | .................... | 455/333 |
| 8,432,016 B1* | 4/2013 | Kerr | ............................... | 257/506 |
| 8,583,111 B2* | 11/2013 | Burgener et al. | ............. | 455/433 |
| 8,723,260 B1* | 5/2014 | Carroll et al. | ................. | 257/347 |
| 2007/0018247 A1* | 1/2007 | Brindle et al. | ................ | 257/347 |
| 2010/0277252 A1* | 11/2010 | Gorbachov | ................... | 333/104 |
| 2011/0221519 A1* | 9/2011 | Katoh et al. | ................... | 327/558 |
| 2012/0064836 A1* | 3/2012 | Bauwelinck et al. | ........... | 455/73 |
| 2012/0262217 A1* | 10/2012 | Gorbachov et al. | ............ | 327/382 |
| 2013/0215808 A1* | 8/2013 | Muthukrishnan et al. | ..... | 370/297 |
| 2014/0062575 A1* | 3/2014 | Hurwitz | ........................ | 327/379 |

FOREIGN PATENT DOCUMENTS

KR  10-2012-0070485 A  6/2012

* cited by examiner

*Primary Examiner* — Marceau Milord
(74) *Attorney, Agent, or Firm* — NSIP Law (57) ABSTRACT

A RF switch may include: a common port coupled to an antenna to transmit and receive first and second high frequency signals; a transmitting switching unit coupled between a transmitting port transferring the first high frequency signal and the common port and including a plurality of switching devices coupled to each other in series; and a receiving switching unit coupled between a receiving port transferring the second high frequency signal and the common port and including a first switching unit including a first switching device. The first switching unit may further include a second switching device having a first terminal coupled to a first terminal of the first switching device and a second terminal coupled to a control terminal of the first switching device.

17 Claims, 12 Drawing Sheets

RF SWITCH

CROSS-REFERENCE TO RELATED APPLICATION

This application claims the benefit of Korean Patent Application No. 10-2013-0136548 filed on Nov. 11, 2013, with the Korean Intellectual Property Office, the disclosure of which is incorporated herein by reference.

BACKGROUND

The present disclosure relates to a radio frequency (RF) switch.

In accordance with the development of wireless communications technology, various communications standards have been developed simultaneously. In addition, in accordance with the miniaturization of wireless communications modules and improvements in the performance of portable communications terminals, the need for individual portable communications terminals to conform to a plurality of communications standards has become apparent. Therefore, the amount of frequency bands that an individual portable communications terminal should be operable with has increased.

That is, existing second-generation (2G) and third-generation (3G) communications technologies have been supplemented with new communications technologies, such that portable communications terminals using fourth-generation (4G) communications schemes such as Long Term Evolution (LTE) have been developed. In addition, in the area of Wi-Fi communications, portable communications terminals have been implemented with the ability to operate with the IEEE 802.11ac standard in addition to the existing IEEE 802.11b/g/n to enhance marketability thereof.

In accordance with this trend, a front end module has been disposed in front of a transceiver to be integrated therewith. In this case, a switch block supporting both transmitting and receiving modes is present.

The switch block should maintain characteristics of a transmitter and a receiver as much as possible. Particularly, the switch block should have low insertion loss and a high P1 dB levels in the transmitting mode and should have low noise in the receiving mode. In addition, in the transmitting mode, a switch on a receiver side may be unintentionally turned on due to a very large signal. This operation may lower a P1 dB level of a switch of the transmitter and deteriorate isolation characteristics between the transmitter and the receiver.

Therefore, a switch structure appropriate for operating with high level signals is required, and there is a need to improve performance of a switch in the transmitting and receiving modes using such a switching structure.

The following Related Art Document (Patent Document 1), related to a RF switching circuit and a control method thereof, discloses a switch capable of preventing an operational change thereof even when a high level signal is applied thereto by generating a predetermined negative voltage and applying drain and source voltages of a switch as opposed to a gate. However, Patent Document 1 does not disclose a technology of decreasing a magnitude of a signal input to a gate using a switching device coupled between the gate and a source or between the gate and a drain to decrease a voltage difference between a source voltage and a gate voltage or between a drain voltage and the gate voltage.

RELATED ART DOCUMENT (Patent Document 1) Korean Patent Laid-Open Publication No. 10-2012-0070485

SUMMARY

An aspect of the present disclosure may provide a radio frequency (RF) switch capable of improving linearity in a transmitting mode by decreasing a magnitude of a signal input to a gate using a switching device coupled between the gate and a source or between the gate and a drain to decrease a voltage difference between a source voltage and a gate voltage or between a drain voltage and the gate voltage and improving performance of a receiver by decreasing the number of switch stacks on a receiver side.

According to an aspect of the present disclosure, a RF switch may include: a common port coupled to an antenna to transmit and receive first and second high frequency signals; a transmitting switching unit coupled between a transmitting port transferring the first high frequency signal and the common port and including a plurality of switching devices coupled to each other in series; and a receiving switching unit coupled between a receiving port transferring the second high frequency signal and the common port and including a first switching unit including a first switching device, wherein the first switching unit further includes a second switching device having a first terminal coupled to a first terminal of the first switching device and a second terminal coupled to a control terminal of the first switching device.

The receiving switching unit may include a plurality of first switching units coupled to each other in series.

Each of the first and second switching devices may be a field effect transistor (FET) or a bipolar junction transistor (BJT).

The first switching unit may further include a first resistor coupled to the control terminal of the first switching device, and a first gate signal is applied to the control terminal of the first switching device through the first resistor.

The first switching unit may further include a first capacitor coupled between the control terminal of the first switching device and the second switching device.

The RF switch may further include a shunt switching unit coupled between the transmitting port and the transmitting switching unit and including a second switching unit including a third switching device, wherein the second switching unit further includes a fourth switching device having a first terminal coupled to a first terminal of the third switching device and a second terminal coupled to a control terminal of the third switching device.

The second switching unit may include a second resistor coupled to the control terminal of the third switching device, and a second gate signal is applied to the control terminal of the third switching device through the second resistor.

According to another aspect of the present disclosure, a RF switch may include: a common port coupled to an antenna to transmit and receive first and second high frequency signals; a transmitting switching unit coupled between a transmitting port transferring the first high frequency signal and the common port and including a plurality of switching devices coupled to each other in series; and a receiving switching unit coupled between a receiving port transferring the second high frequency signal and the common port and including a plurality of switching circuit units coupled to each other in series, wherein each of the plurality of switching circuit units includes first and second switching devices, the second switching device having a first connection point at which a control terminal and a second terminal thereof are coupled to each other, and the first switching device having a control terminal coupled to the first connection point.

Each of the plurality of switching circuit units may further include a first resistor coupled to the control terminal of the first switching device, and a first gate signal may be applied to the control terminal of the first switching device through the first resistor.

Each of the first and second switching devices may be an FET or a BJT.

Each of the plurality of switching circuit units may further include a capacitor coupled between the control terminal of the first switching device and the first connection point.

The RF switch may further include a shunt switching unit coupled between the transmitting port and the transmitting switching unit and including a plurality of switching circuit units coupled to each other in series, wherein each of the plurality of switching circuit units of the shunt switching unit includes third and fourth switching devices, the third switching device having a second connection point at which a control terminal and a second terminal thereof are coupled to each other, and the fourth switching device having a control terminal coupled to the second connection point.

Each of the plurality of switching circuit units of the shunt switching unit may include a second resistor coupled to the control terminal of the third switching device, and a second gate signal may be applied to the control terminal of the third switching device through the second resistor.

According to another aspect of the present disclosure, a RF switch may include: a common port coupled to an antenna to transmit and receive first and second high frequency signals; a transmitting switching unit coupled between a transmitting port transferring the first high frequency signal and the common port and including a plurality of switching devices coupled to each other in series; and a receiving switching unit coupled between a receiving port transferring the second high frequency signal and the common port and including a first switching unit including a first switching device, wherein the first switching unit further includes a second switching device having a first terminal coupled to a first terminal of the first switching device and a second terminal coupled to a control terminal of the first switching device and a third switching device having a first terminal coupled to the control terminal of the first switching device and a second terminal coupled to the first terminal of the first switching device.

The receiving switching unit may include a plurality of first switching units coupled to each other in series.

The first switching unit may further include a first resistor coupled to the control terminal of the first switching device, and a first gate signal is applied to the control terminal of the first switching device through the first resistor.

The first switching unit may further include a first capacitor coupled between the control terminal of the first switching device and the second switching device and a second capacitor coupled between the control terminal of the first switching device and the third switching device.

The RF switch may further include a shunt switching unit coupled between the transmitting port and the transmitting switching unit and including a second switching unit including a fourth switching device, wherein the second switching unit further includes a fifth switching device having a first terminal coupled to a first terminal of the fourth switching device and a second terminal coupled to a control terminal of the fourth switching device and a sixth switching device having a first terminal coupled to the control terminal of the fourth switching device and a second terminal coupled to the first terminal of the fourth switching device.

The second switching unit may include a third resistor coupled to a control terminal of the fifth switching device and a fourth resistor coupled to a control terminal of the sixth switching device, and a second gate signal is applied to the control terminals of the fifth and sixth switching devices through the third and fourth resistors, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

Figure 1:
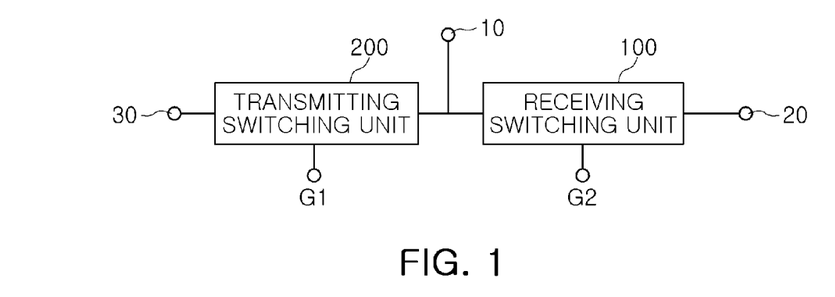
FIG. 1 is a block diagram illustrating a RF switch according to an exemplary embodiment of the present disclosure.

FIG. 1 is a block diagram illustrating a RF switch according to an exemplary embodiment of the present disclosure.

Referring to FIG. 1, a RF switch according to an exemplary embodiment of the present disclosure may include a common port 10, a transmitting switching unit 100, and a receiving switching unit 200.

The common port 10 may be coupled to an antenna to transmit and receive first and second high frequency signals. The transmitting switching unit 100 may be coupled between a transmitting port 20 from which the first high frequency signal is output and the common port 10 and may include a plurality of switching devices coupled to each other in series.

Meanwhile, the receiving switching unit 200 may be coupled between a receiving port 30 to which the second high frequency signal is input and the common port 10. The receiving switching unit 200 will be described in more detail with reference to FIGS. 2A and 2B.

Figure 2A:
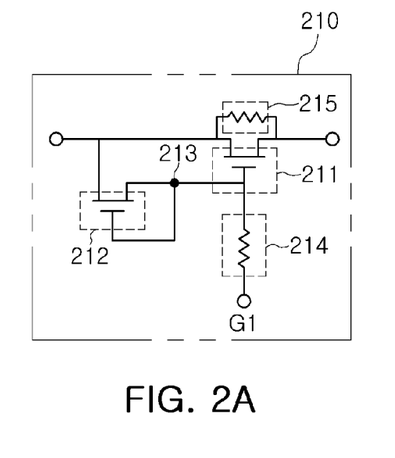
FIG. 2A is a circuit diagram illustrating an example of a first switching unit included in a receiving switching unit according to an exemplary embodiment of the present disclosure.
Figure 2B:
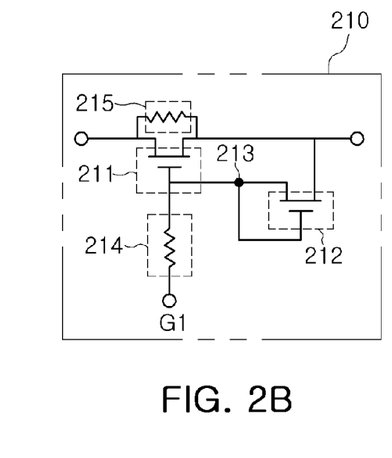
FIG. 2B is a circuit diagram illustrating another example of a first switching unit included in a receiving switching unit according to an exemplary embodiment of the present disclosure.

FIGS. 2A and 2B are circuit diagrams illustrating a portion of a first switching unit 210 included in a receiving switching unit 200 according to an exemplary embodiment of the present disclosure.

Referring to FIG. 2A, the first switching unit 210 may include a first switching device 211 and may further include a second switching device 212.

Here, each of the first and second switching devices 211 and 212 may be a field effect transistor (FET) or a bipolar junction transistor (BJT). Hereinafter, the case in which each of the switching devices included in the RF switch according to an exemplary embodiment of the present disclosure is the FET will be described.

Therefore, hereinafter, the case in which a first terminal of each of the first and second switching devices 211 and 212 is a source, a second terminal thereof is a drain, and a control terminal thereof is a gate will be described.

In more detail, the source of the second switching device 212 may be coupled to the source of the first switching device 211, and the drain of the second switching device 212 may be coupled to the gate of the first switching device 211.

The first switching unit 210 may include a resistor 214 coupled to the gate of the first switching device 211, and a first gate signal G1 may be applied to the first switching device 211 through the first resistor 214.

In addition, the first switching unit 210 may include at least one resistor 215 coupled between the drain and the source of the first switching device 211.

Meanwhile, referring to FIG. 2, the source of the second switching device 212 may be coupled to the gate of the first switching device 211, and the drain of the second switching device 212 may be coupled to the drain of the first switching device 211.

Here, the first switching unit 210 illustrated in FIG. 2B may include a first resistor 214 coupled to the gate of the first switching device 211, and a first gate signal G1 may be applied to the first switching device 211 through the first resistor 214. In addition, the first switching unit 210 may include at least one resistor 215 coupled between the drain and the source of the first switching device 211.

Meanwhile, a connection relationship of the first switching unit 210 illustrated in FIG. 2B is slightly different from that of the first switching unit 210 illustrated in FIG. 2A, but an operation, an effect, and the like, of the first switching unit 210 illustrated in FIG. 2B are the same as those of the first switching unit 210 illustrated in FIG. 2A. Therefore, hereinafter, the first switching unit 210 illustrated in FIG. 2A will be mainly described.

Figure 3A:
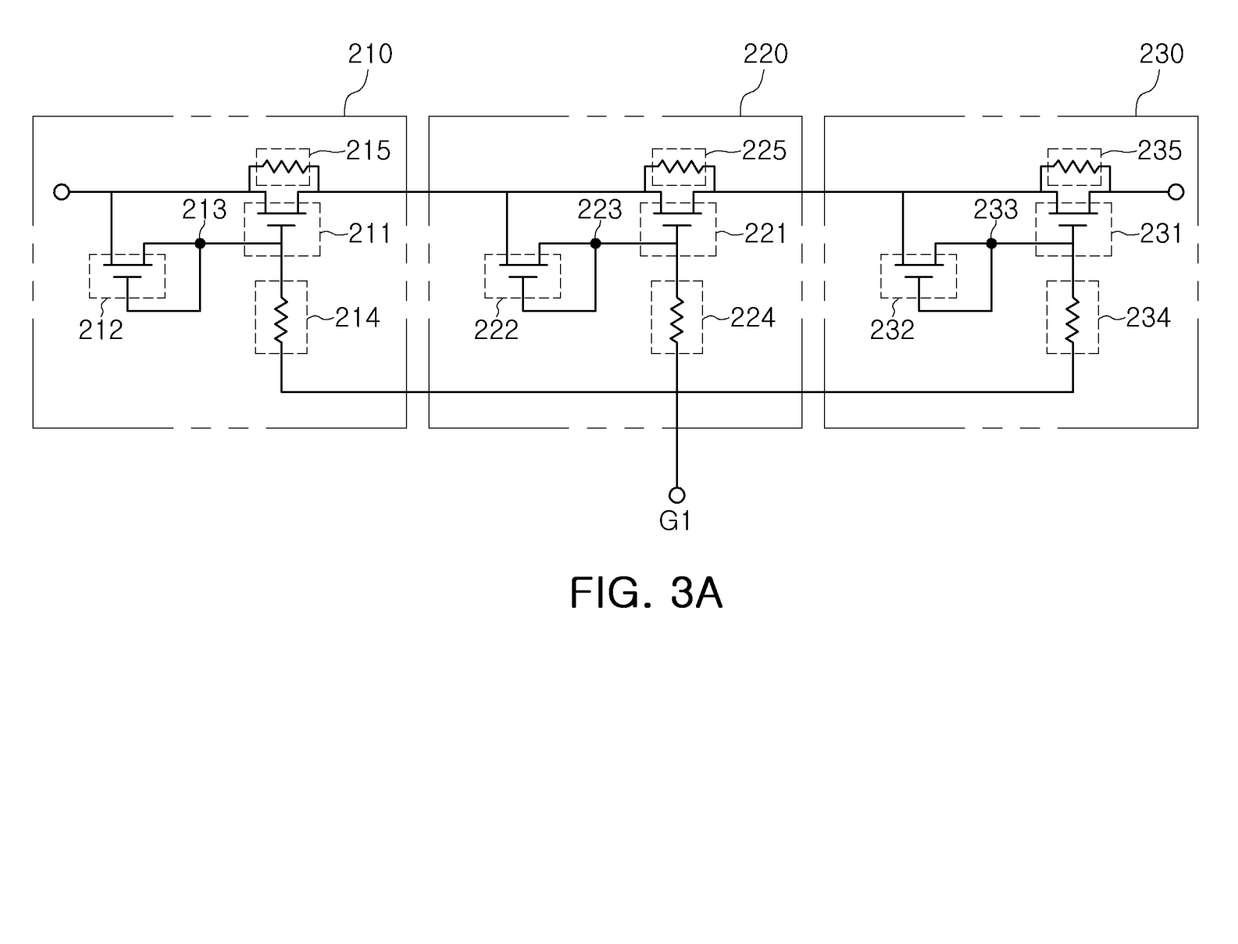
FIG. 3A is a circuit diagram illustrating a receiving switching unit in which first switching units illustrated in FIG. 2A are coupled to each other in series.
Figure 3B:
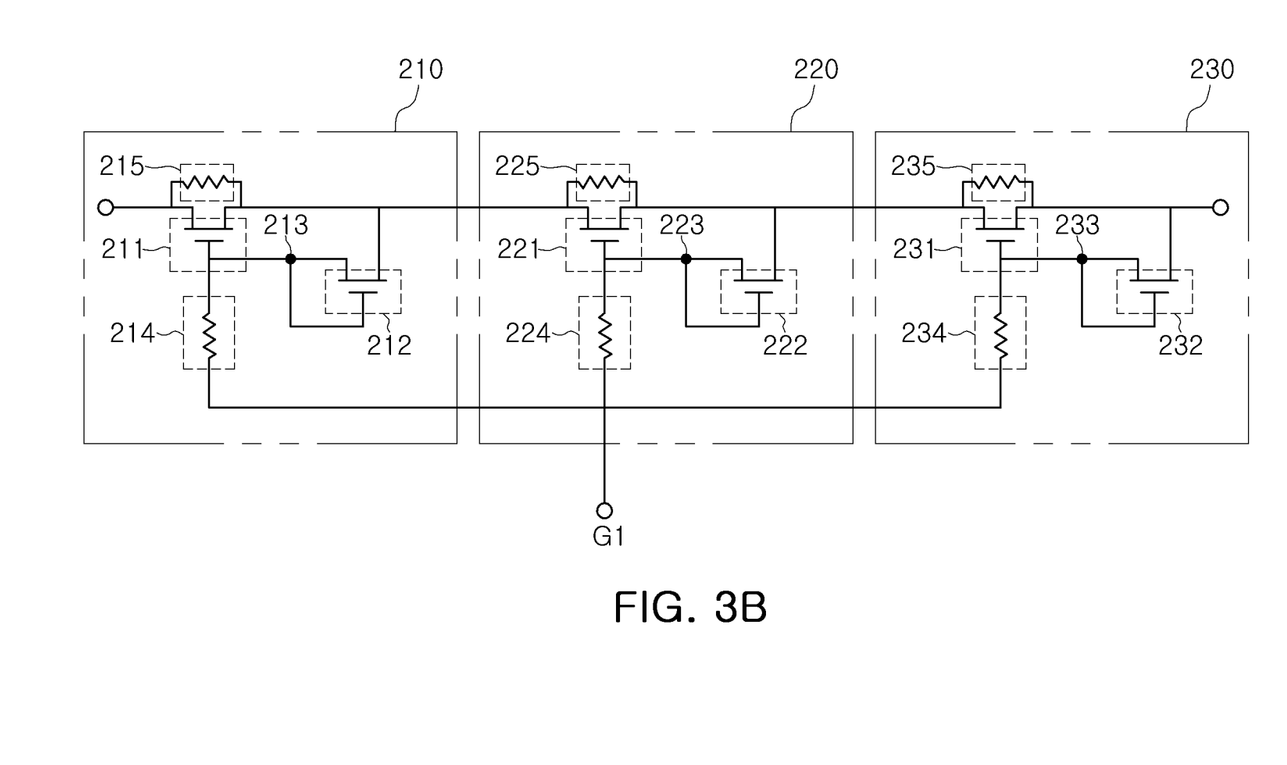
FIG. 3B is a circuit diagram illustrating a receiving switching unit in which first switching units illustrated in FIG. 2B are coupled to each other in series.

FIG. 3A is a circuit diagram illustrating a receiving switching unit 200 in which first switching units 210 illustrated in FIG. 2A are coupled to each other in series. FIG. 3B is a circuit diagram illustrating a receiving switching unit 200 in which first switching units 210 illustrated in FIG. 2B are coupled to each other in series.

That is, the receiving switching unit 200 may include at least one first switching unit 210 or include a plurality of first switching units 210. In the case in which the receiving switching unit 200 includes the plurality of first switching units 210, the plurality of first switching units 210 may be coupled to each other in series.

The case in which three first switching units 210, 220, and 230 are coupled to each other in series has been illustrated in FIGS. 3A and 3B, this is only an example for explanation, and the present disclosure is not limited thereto.

Figure 4A:
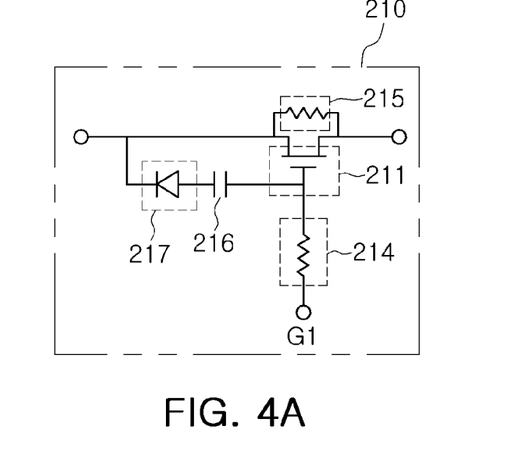
FIG. 4A is a block diagram for describing an operation principle of the RF switch according to an exemplary embodiment of the present disclosure.
Figure 4B:
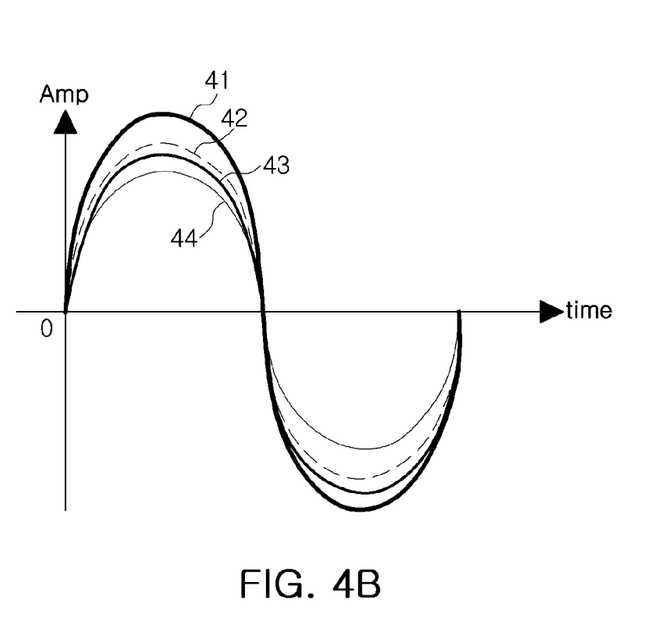
FIG. 4B is a graph for describing an operation principle of the RF switch according to an exemplary embodiment of the present disclosure.

FIGS. 4A and 4B are diagrams for describing an operation principle of the RF switch according to an exemplary embodiment of the present disclosure.

An operation principle of the RF switch according to an exemplary embodiment of the present disclosure will be described with reference to FIGS. 2A, 4A, and 4B.

As a method of completely turning-off the receiving switching unit 200, there may be a method of generating a gate-source voltage or a gate-drain voltage so as to be smaller than a threshold voltage at which a channel of the switching device is opened.

That is, in the RF switch according to an exemplary embodiment of the present disclosure, in the case in which a large signal is introduced, a magnitude of a signal input to the gate through a parasitic capacitor of the first switching device 211 may be decreased using the second switching device 212. In more detail, a voltage difference between a source voltage and a gate voltage of the first switching device 211 or between a drain voltage and the gate voltage of the first switching device 211 may be decreased by a threshold voltage at which a channel of the first switching device 211 is opened, using the second switching device 212.

Referring to FIG. 4B, a gate voltage of the first switching device 211 is adjusted from an existing gate voltage 42 to a current gate voltage 43 by the second switching device 212, whereby the voltage difference between a source voltage 41 and a gate voltage 43 of the first switching device 211 or between a drain voltage 44 and the gate voltage 43 thereof may be decreased.

That is, the RF switch according to an exemplary embodiment of the present disclosure may change bias characteristics of the gate of the first switching device 211 by a threshold voltage in an alternating current (AC) form without separately adjusting a direct current (DC) bias. Therefore, even in the case in which the large signal is introduced, the channel of the first switching device 211 may not be completely opened, such that the switching device included in the receiving switching unit 200 may be completely turned off in a transmitting mode.

Figure 5A:
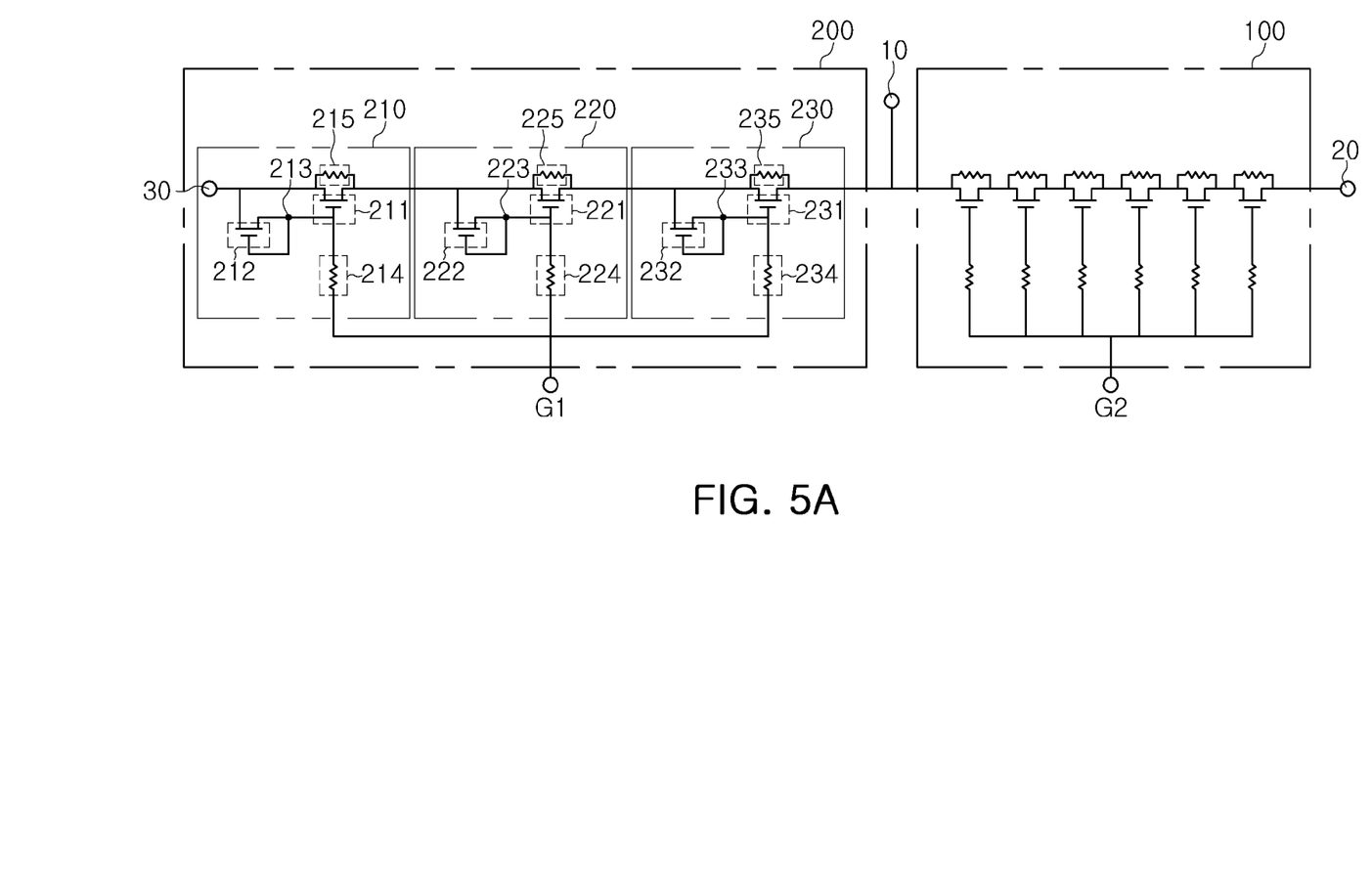
FIG. 5A is a circuit diagram illustrating a detailed example of the block diagram illustrated in FIG. 1.

FIG. 5A is a circuit diagram illustrating a detailed example of the block diagram illustrated in FIG. 1.

Figure 5B:
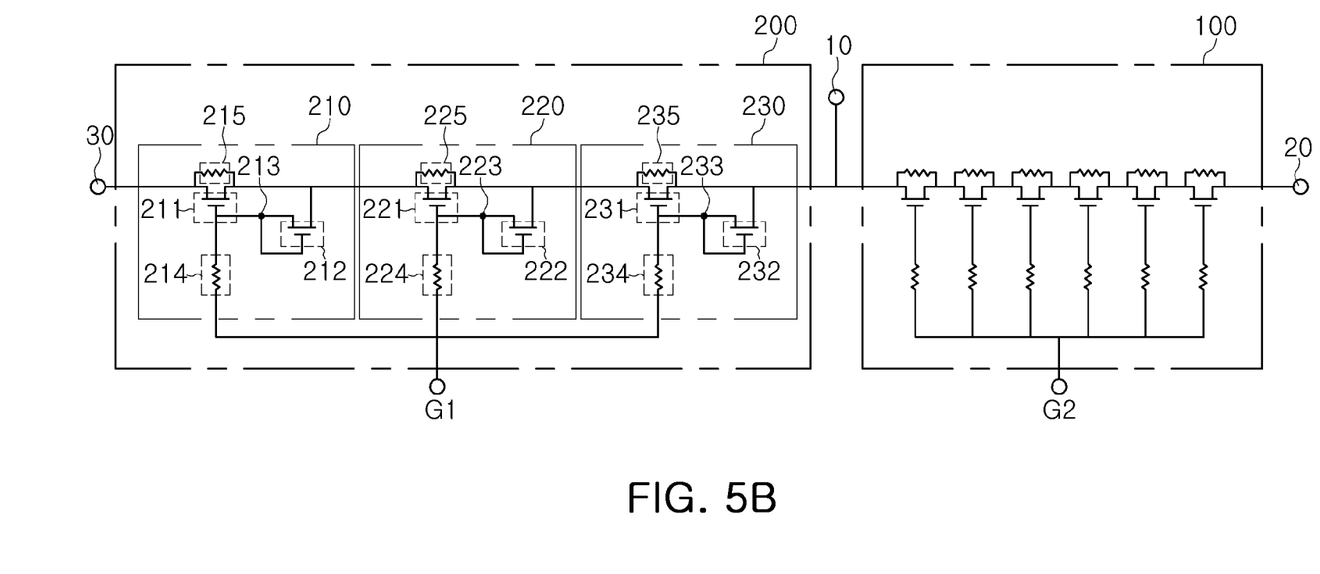
FIG. 5B is a circuit diagram illustrating another detailed example of the block diagram illustrated in FIG. 1.

FIG. 5B is a circuit diagram illustrating another detailed example of the block diagram illustrated in FIG. 1.

Referring to FIG. 5A, the receiving switching unit 200 may include a plurality of first switching units 210, 220, and 230 coupled to each other in series. A description of each of the first switching units has been described above, and an operation thereof will be described below.

Although the case in which each of the plurality of switching devices included in the receiving switching unit 200 is the FET has been illustrated in FIGS. 3A, 3B, 5A, and 5B, the present disclosure is not limited thereto. That is, each of the plurality of switching devices included in the receiving switching unit 200 may also be the BJT described above.

Figure 6:
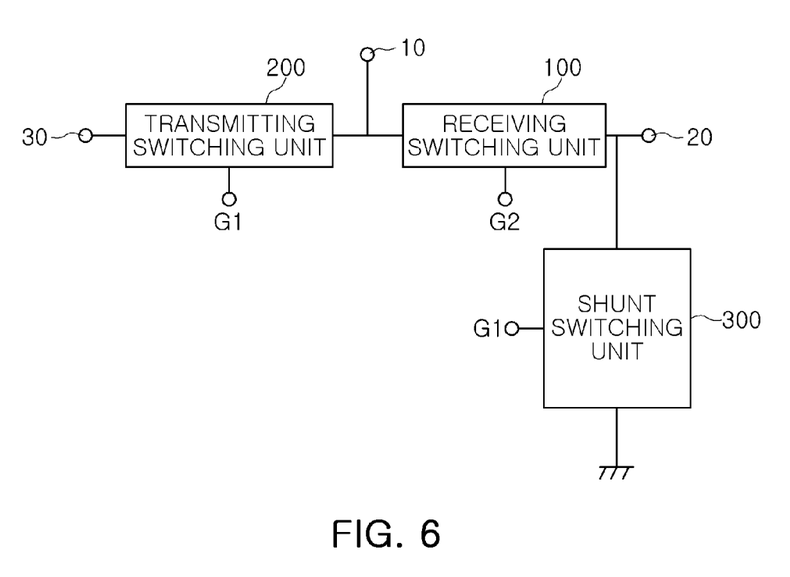
FIG. 6 is a block diagram illustrating a RF switch according to another exemplary embodiment of the present disclosure.

FIG. 6 is a block diagram illustrating a RF switch according to another exemplary embodiment of the present disclosure.

Figure 7:
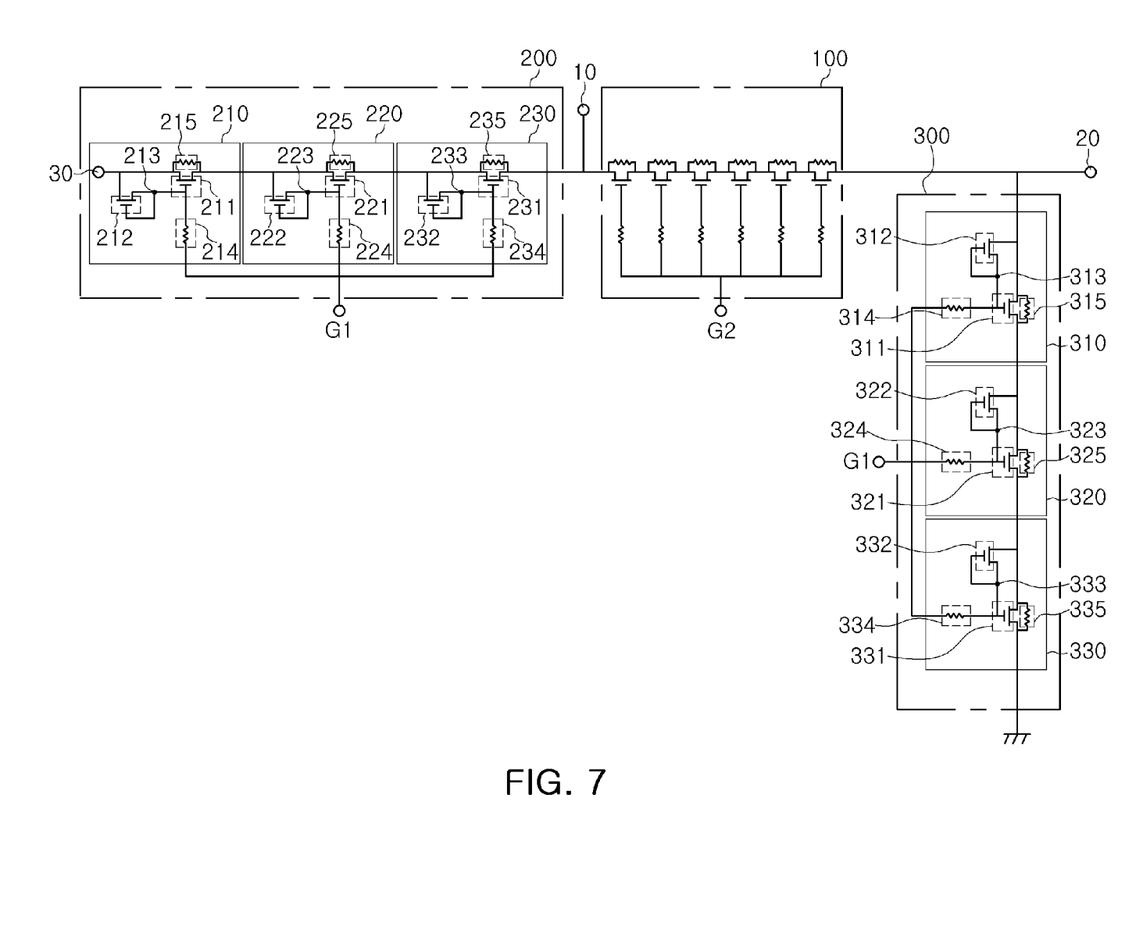
FIG. 7 is a circuit diagram illustrating a detailed example of the block diagram illustrated in FIG. 6.

FIG. 7 is a circuit diagram illustrating a detailed example of the block diagram illustrated in FIG. 6.

Referring to FIGS. 6 and 7, a RF switch according to another exemplary embodiment of the present disclosure may further include a shunt switching unit 300 in addition to the transmitting switching unit 100 and the receiving switching unit 200 described above. The shunt switching unit 300 may be coupled to the transmitting port 20 and the transmitting switching unit 100 and may further include a second switching unit 310 including third and fourth switching devices 311 and 312. Here, the third switching device 311 may have a second connection point 313 at which a gate and a drain thereof are coupled to each other, and the fourth switching device 312 may have a gate coupled to the second connection point 313.

In addition, the number of second switching units 310 may be at least one, or a plurality of second switching units 310 may be coupled to each other in series. Here, the second switching unit 310 may include a second resistor 314 coupled to the gate of the third switching device 311, and a first gate signal G1 may be applied to the gate of the third switching device 311 through the second resistor 314.

Meanwhile, each of first to fifth switching devices 211 to 214 included in the first and second switching units 210 and 310 may be an FET or a BJT.

The RF switch according to another exemplary embodiment of the present disclosure will be described in detail with reference to FIG. 6. The transmitting switching unit 100 and the receiving switching unit 200 according to another exemplary embodiment of the present disclosure may be coupled to the common port 10 and the transmitting port 20 and the common port 10 and the receiving port 30, respectively.

As illustrated in FIG. 6, in the RF switch, one ends of the transmitting switching unit 100 and the receiving switching unit 200 may be commonly coupled to the common port 10, the other end of the transmitting switching unit 100 may be coupled to the transmitting port 20, and the other end of the receiving switching unit 200 may be coupled to the receiving port 30. Here, the common port 10 may be coupled to an antenna transmitting or receiving a high frequency signal.

The transmitting switching unit 100 may transfer the high frequency signal received in the common port 10 through the antenna as an input to the transmitting port 30 and transfer the high frequency signal output from the transmitting port 20 as a transmitting signal to the common port 10.

In addition, the receiving switching unit 200 may transfer the high frequency signal received in the common port 10 through the antenna as an input to the receiving port 11 and transfer the high frequency signal output from the receiving port 30 as a transmitting signal to the common port 10.

Here, the transmitting switching unit 100 and the receiving switching unit 200 may perform any one of a function of transmitting the high frequency signal and a function of receiving the high frequency signal. For example, in the case in which the transferring switching unit 100 performs the function of transferring a transmitted radio frequency signal, the receiving switching unit 200 may perform a function of transferring a received radio frequency signal.

The shunt switching unit 300 may be positioned between the transmitting switching unit 100 and the transmitting port 20 to bypass a residual signal, or the like, of the transmitting switching unit 100 to the ground. Although the case in which the shunt switching unit 300 is positioned between the transmitting switching unit 100 and the transmitting port 20 has been described, the shunt switching unit may also be positioned between the receiving port 30 and the receiving switching unit 200. However, a description thereof will be omitted.

In an example of FIG. 7, the receiving switching unit 200 may perform the same switching operation as that of the shunt switching unit 300.

For example, the case in which a first gate signal G1 applied to each of the receiving switching unit 200 and the shunt switching unit 300 is a low L signal will be described.

The transmitting switching unit 100 may be turned on to conduct between the transmitting port 20 and the common port 10, and the receiving switching unit 200 may be turned off to block between the receiving port 30 and the common port 10. In addition, the shunt switching unit 300 may be turned off to block between the transmitting port 20 and the ground. In this case, a path from the transmitting port 20 to the common port 10 may be in an available state.

Therefore, in this case, the transmitting switching unit 100 may be operated in a turn-on state, such that a first high frequency signal may be smoothly transferred between the transmitting port 20 and the common port 10, and the receiving switching unit 200 and the shunt switching unit 300 may be operated in a turn-off state, such that an unnecessary flow of the first high frequency signal may be blocked.

As described above, the transmitting switching unit 100 and a second shunt unit 400 may receive the gate signal G1 having the same level, respectively, to perform the same switching operation, and the receiving switching unit 200 and the shunt switching unit 300 may receive the same gate signal G1, respectively, to perform the same switching operation. However, the present disclosure is not limited thereto. That is, the transmitting switching unit 100, the receiving switching unit 200, the shunt switching unit 300, and the second shunt unit 400 may also receive arbitrarily set first and second gate signals G1 and G2, respectively, to perform different switching operations.

That is, in a transmitting mode, a switch of the receiving switching unit 200 may be unintentionally turned on due to a large signal. This operation may lower a P1 dB of a switch of the transmitting switching unit 100 and deteriorate isolation characteristics between the transmitting switching unit 100 and the receiving switching unit 200.

Therefore, in the RF switch according to an exemplary embodiment of the present disclosure, a magnitude of a signal input to the gate in the large signal due to the voltage difference between the gate voltage and the drain voltage may be decreased using the switching device coupled between the gate and the source of the first switching device 211 or between the gate and the drain thereof. That is, the voltage difference between the source voltage and the gate voltage or between the drain voltage and the gate voltage may be decreased to improve linearity in the transmitting mode, whereby the switching device included in the receiving switching unit 200 may be completely turned off.

Figure 8:
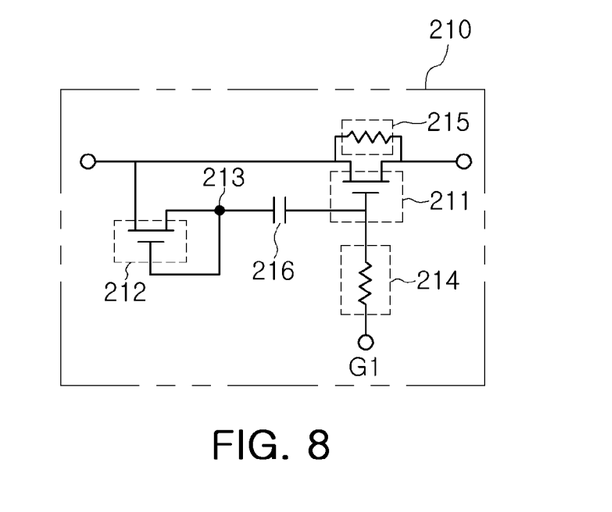
FIG. 8 is a circuit diagram illustrating another example of a first switching unit included in a receiving switching unit according to an exemplary embodiment of the present disclosure.

FIG. 8 is a circuit diagram illustrating another example of a first switching unit included in a receiving switching unit according to an exemplary embodiment of the present disclosure.

Referring to FIG. 8, the first switching unit 210 may further include a first capacitor 216.

Referring to FIGS. 4A and 8, the first switching unit 210 according to an exemplary embodiment of the present disclosure may separate a bias using the first capacitor 216. In the case in which the transmitting switching unit 100 is operated, the large signal may be applied to the first switching device 211 of the first switching unit 210. Therefore, a diode 217 may be turned on, such that there may be a risk that characteristics in the transmitting mode will be deteriorated.

Therefore, when the bias is separated and operated by the first capacitor 216, a phenomenon that the diode 217 is turned on may be prevented even in the transmitting mode.

Figure 9:
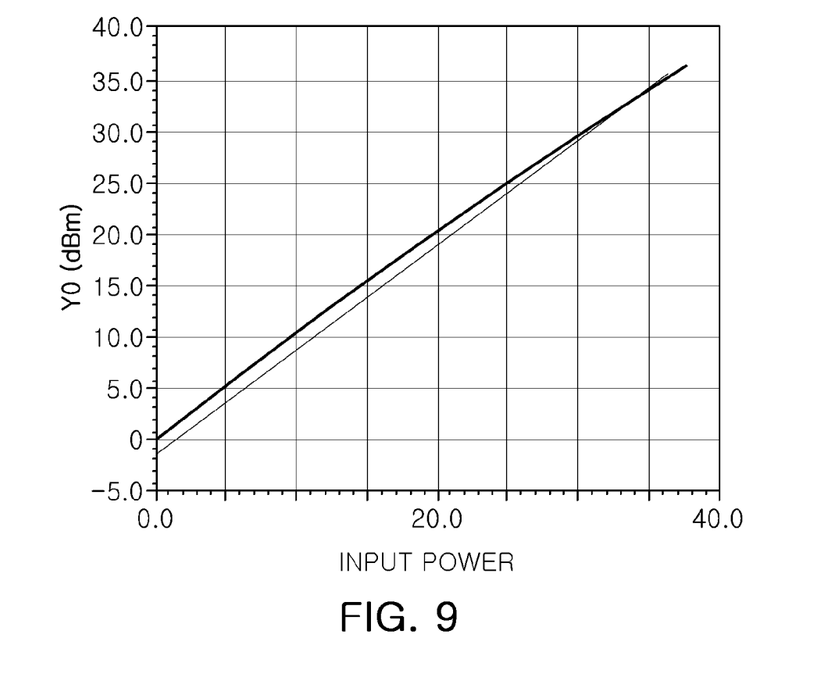
FIGS. 9 through 11 are graphs illustrating simulation results of the RF switch according to an exemplary embodiment of the present disclosure.
Figure 10:
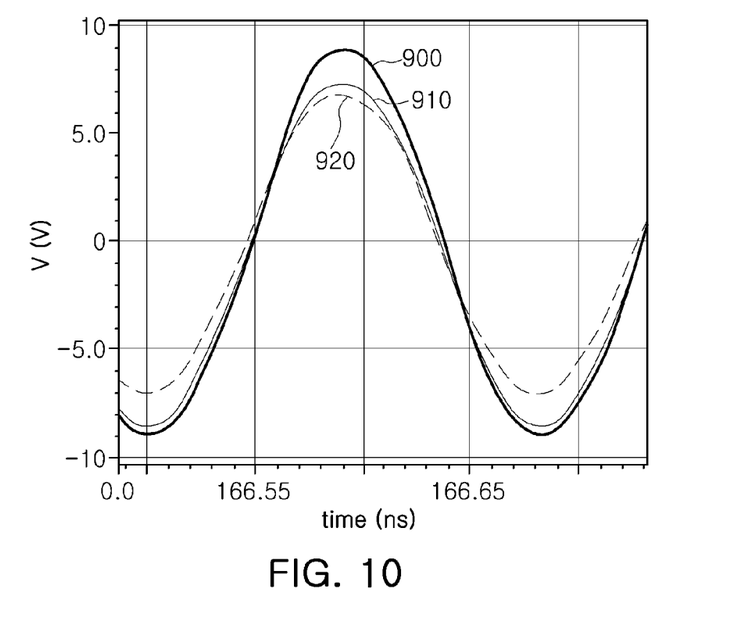
Figure 11:
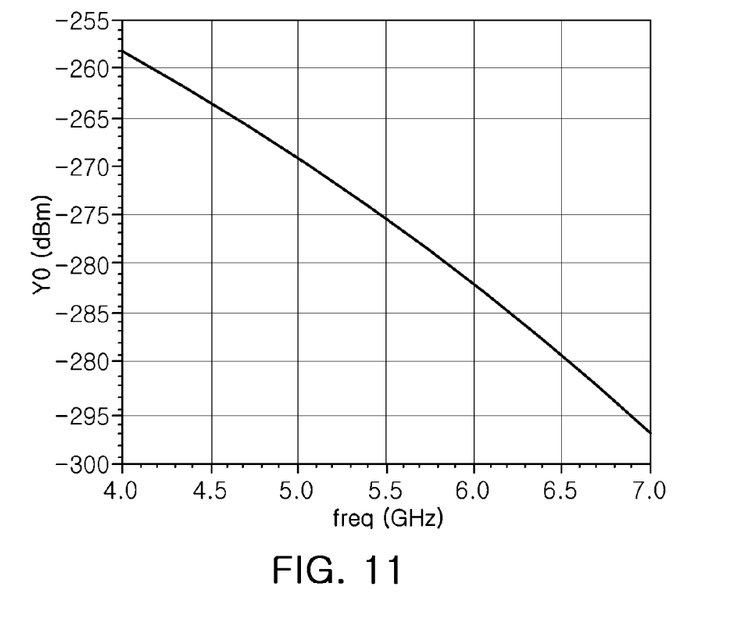

FIGS. 9 through 11 are graphs illustrating simulation results of the RF switch according to an exemplary embodiment of the present disclosure.

Figure 12:
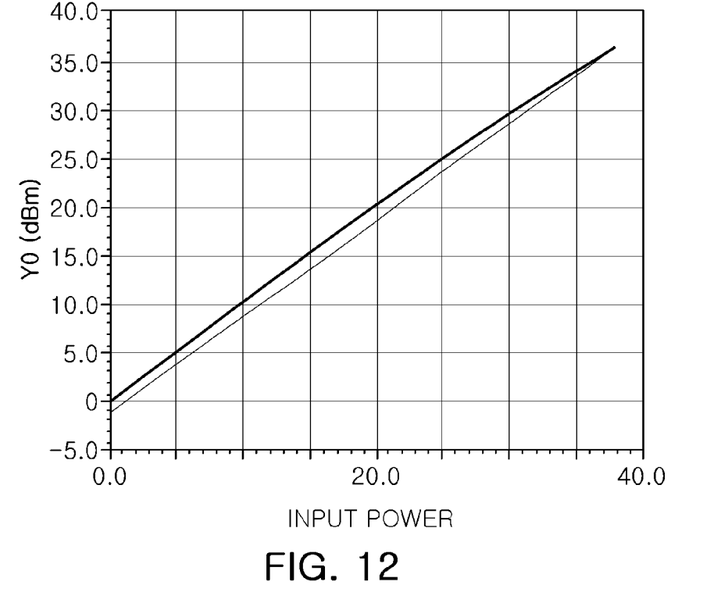
FIGS. 12 through 14 are graphs illustrating simulation results of a RF switch according to the related art.
Figure 13:
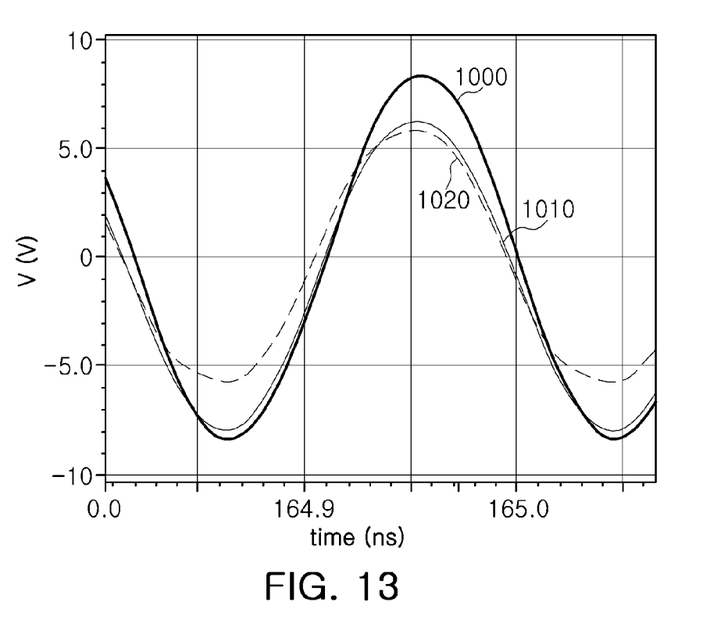
Figure 14:
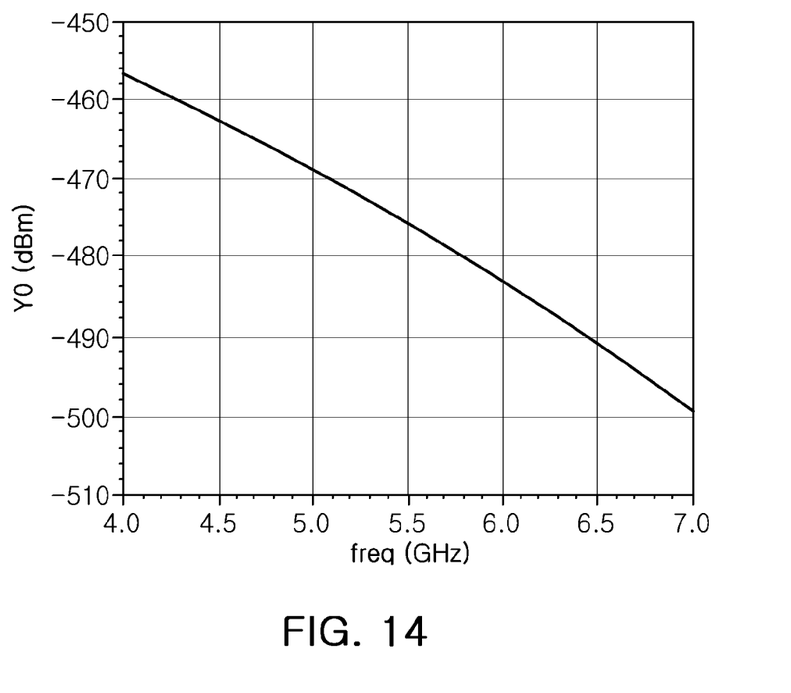

FIGS. 12 through 14 are graphs illustrating simulation results of a RF switch according to the related art.

Referring to FIGS. 9 through 11, it may be confirmed as simulation results that the case in which four first switching units 210 included in the RF switch according to an exemplary embodiment of the present disclosure, particularly, the receiving switching unit 200 are coupled to each other in series has a P1 dB higher than that of the RF switch according to the related art by 7 dB and a breakdown of a plurality of switching devices included in the receiving switching unit 200 is not affected.

In addition, voltage swing 900, 910, and 920 of a source, a gate, and a drain of the RF switch according to an exemplary embodiment of the present disclosure are illustrated in FIG. 10, and voltage swings 1000, 1010, and 1020 of a source, a gate, and a drain of the RF switch according to the related art are illustrated in FIG. 13.

That is, since a voltage difference between a gate voltage 910 and a drain voltage 920 of the RF switch according to an exemplary embodiment of the present disclosure is smaller than a threshold voltage of the switching device used in the receiving switching unit 200, the switching device included in the receiving switching unit 200 may not be turned on even in the large signal, in the transmitting mode.

In addition, FIGS. 9 through 11 show the simulation results of the case in which four first switching units 210 included the RF switch according to an exemplary embodiment of the present disclosure, particularly, in the receiving switching unit 200 are coupled to each other in series, and FIGS. 12 through 14 show the simulation results of the case in which eight switching devices included in the RF switch according to the related art are coupled to each other in series.

That is, in the RF switch according to the related art, six to eight switching devices need to be coupled to each other in series in the receiving switching unit in order to obtain a P1 dB. However, referring to FIGS. 9 through 11, in the RF switch according to an exemplary embodiment of the present disclosure, only four first switching units 210 need to be coupled to each other in series in order to obtain the P1 dB, such that noise characteristics of the receiving switching unit 200 may be satisfied.

As set forth above, according to exemplary embodiments of the present disclosure, the RF switch includes the receiving switching unit in which the gate of the first switching device is coupled to the source or the drain of the second switching device, whereby linearity may be improved in the transmitting mode, and the number of switch stacks of the receiver side is decreased, whereby performance of the receiver may be improved.

While exemplary embodiments have been shown and described above, it will be apparent to those skilled in the art that modifications and variations could be made without departing from the spirit and scope of the present disclosure as defined by the appended claims.

What is claimed is:

1. A RF (Radio Frequency) switch comprising:
   a common port coupled to an antenna to transmit and receive first and second high frequency signals;
   a transmitting switching unit coupled between a transmitting port transferring the first high frequency signal and the common port and including a plurality of switching devices coupled to each other in series; and
   a receiving switching unit coupled between a receiving port transferring the second high frequency signal and the common port and including a first switching unit including a first switching device, wherein
   the first switching unit further includes a second switching device having a first terminal coupled to a first terminal of the first switching device and a second terminal coupled to a control terminal of the first switching device.

2. The RF switch of claim 1, wherein the receiving switching unit includes a plurality of first switching units coupled to each other in series.

3. The RF switch of claim 1, wherein each of the first and second switching devices is a field effect transistor (FET) or a bipolar junction transistor (BJT).

4. The RF switch of claim 1, wherein the first switching unit further includes a first resistor coupled to the control terminal of the first switching device, and a first gate signal is applied to the control terminal of the first switching device through the first resistor.

5. The RF switch of claim 1, wherein the first switching unit further includes a first capacitor coupled between the control terminal of the first switching device and the second switching device.

6. An RF (Radio Frequency) switch comprising:
   a common port couple to an antenna to transmit and receive a first high frequency signal and a second high frequency signal;
   a transmitting switching unit coupled between a transmitting port transferring the first high frequency signal and the common port and including a plurality of switching devices couple to each other in series;
   a receiving switching unit coupled between a receiving port transferring the second high frequency signal and the common port and including a first switching unit including a first switching device; and
   a shunt switching unit coupled between the transmitting port and the transmitting switching unit and including a second switching unit including a third switching device,
   wherein the first switching unit further includes a second switching device having a first terminal coupled to a first terminal of the first switching device and a second terminal coupled to a control terminal of the first switching device, and the second switching unit further includes a fourth switching device having a first terminal coupled to a first terminal of the third switching device and a second terminal coupled to a control terminal of the third switching device.

7. The RF switch of claim 6, wherein the second switching unit includes a second resistor coupled to the control terminal of the third switching device, and a second gate signal is applied to the control terminal of the third switching device through the second resistor.

8. A RF switch comprising:
   a common port coupled to an antenna to transmit and receive first and second high frequency signals;
   a transmitting switching unit coupled between a transmitting port transferring the first high frequency signal and the common port and including a plurality of switching devices coupled to each other in series; and
   a receiving switching unit coupled between a receiving port transferring the second high frequency signal and the common port and including a plurality of switching circuit units coupled to each other in series, wherein each of the plurality of switching circuit units includes first and second switching devices, the second switching device having a first connection point at which a control terminal and a second terminal thereof are coupled to each other, and the first switching device having a control terminal coupled to the first connection point.

9. The RF switch of claim 8, wherein each of the plurality of switching circuit units further includes a first resistor coupled to the control terminal of the first switching device, and a first gate signal is applied to the control terminal of the first switching device through the first resistor.

10. The RF switch of claim 8, wherein each of the first and second switching devices is an FET or a BJT.

11. The RF switch of claim 8, wherein each of the plurality of switching circuit units further includes a capacitor coupled between the control terminal of the first switching device and the first connection point.

12. An RF switch comprising:

a common port coupled to an antenna to transmit and receive a first high frequency signal and a second high frequency signal;

a transmitting switching unit coupled between a transmitting port transferring the first high frequency signal and the common port and including a plurality of switching devices coupled to each other in series;

a receiving switching unit coupled between a receiving port transferring the second high frequency signal and the common port and including a plurality of switching circuit units coupled to each other in series; and a shunt switching unit coupled between the transmitting port and the transmitting switching unit and including a plurality of switching circuit units coupled to each other in series, wherein each of the plurality of switching circuit units includes first and second switching devices, the second switching device having a first connection point at which a control terminal and a second terminal thereof are coupled to each other, and the first switching device having a control terminal coupled to the first connection point, and each of the plurality of switching circuit units of the shunt switching unit includes third and fourth switching devices, the third switching device having a second connection point at which a control terminal and a second terminal thereof are coupled to each other, and the fourth switching device having a control terminal coupled to the second connection point.

13. The RF switch of claim 12, wherein each of the plurality of switching circuit units of the shunt switching unit includes a second resistor coupled to the control terminal of the third switching device, and a second gate signal is applied to the control terminal of the third switching device through the second resistor.

14. A RF switch comprising:

a common port coupled to an antenna to transmit and receive first and second high frequency signals;

a transmitting switching unit coupled between a transmitting port transferring the first high frequency signal and the common port and including a plurality of switching devices coupled to each other in series;

a receiving switching unit coupled between a receiving port transferring the second high frequency signal and the common port and including a first switching unit including a first switching device; and a shunt switching unit coupled between the transmitting port and the transmitting switching unit and including a second switching unit including a third switching device, wherein the first switching unit further includes a second switching device having a first terminal coupled to a first terminal of the first switching device and a second terminal coupled to a control terminal of the first switching device.

15. An RF switch comprising:

a common port coupled to an antenna to transmit an receive a first high frequency signal and a second high frequency signal;

a transmitting switching unit coupled between a transmitting port transferring the first high frequency signal and the common port and including a plurality of switching devices coupled to each other in series;

a receiving switching unit coupled between a receiving port transferring the second high frequency signal and the common port and including a plurality of switching circuit units coupled to each other in series; and a shunt switching unit coupled between the transmitting port and the transmitting switching unit and including a plurality of switching circuit units coupled to each other in series, wherein each of the plurality of switching circuit units includes first and second switching devices, the second switching device having a first connection point at which a control terminal and a second terminal thereof are coupled to each other, and the first switching device having a control terminal coupled to the first connection point.

16. An RF (Radio Frequency) switch comprising:

a common port coupled to an antenna to transmit an receive a first high frequency signal and a second high frequency signal;

a transmitting switching unit coupled between a transmitting port transferring the first high frequency signal and the common port and including a plurality of switching devices coupled to each other in series;

a receiving switching unit coupled between a receiving port transferring the second high frequency signal and the common port and including a first switching unit including a first switching device; and a shunt switching unit coupled between the transmitting port and the transmitting switching unit and including a second switching unit including a third switching device, wherein the first switching unit further includes a second switching device having a first terminal coupled to a first terminal of the first switching device and a second terminal coupled to a control terminal of the first switching device, the first switching unit further includes a first capacitor coupled between the control terminal of the first switching device and the second switching device.

17. An RF switch comprising:

a common port coupled to an antenna to transmit and receive a first high frequency signal and a second high frequency signal;

a transmitting switching unit coupled between a transmitting port transferring the first high frequency signal and the common ort and including a plurality of switching devices coupled to each other in series;

a receiving switching unit coupled between a receiving port transferring the second high frequency signal and the common port and including a plurality of switching circuit units coupled to each other in series; and a shunt switching unit coupled between the transmitting port and the transmitting switching unit and including a plurality of switching circuit units coupled to each other in series, wherein each of the plurality of switching circuit units includes first and second switching devices, the second switching device having a first connection point at which a control terminal and a second terminal thereof are coupled to each other, and the first switching device having a control terminal coupled to the first connection point, each of the plurality of switching circuit units further includes a capacitor coupled between the control terminal of the first switching device and the first connection point.

* * * * *